United States Patent [19]
Emeott et al.

[11] Patent Number: 5,754,734
[45] Date of Patent: May 19, 1998

[54] METHOD OF TRANSMITTING VOICE CODING INFORMATION USING CYCLIC REDUNDANCY CHECK BITS

[75] Inventors: Stephen Paul Emeott, Schaumburg; Gregory Charles White, Palatine; John G. Ronk, Batavia; Bob Hsun Lee, Des Plaines, all of Ill.

[73] Assignee: Motorola, Inc., Schaumburg, Ill.

[21] Appl. No.: 550,972

[22] Filed: Oct. 31, 1995

[51] Int. Cl.[6] .................................................... G10L 9/18
[52] U.S. Cl. ........................ 395/2.35; 395/2.1; 395/2.2; 395/2.36; 395/2.37; 395/2.38
[58] Field of Search ................................ 395/2.2, 2.33, 395/2.35, 2.36, 2.37, 2.38

[56] References Cited

U.S. PATENT DOCUMENTS 4,489,418  12/1984  Mazo ....................................... 375/246
4,649,542  3/1987  Nishimura et al. ..................... 371/37.4
5,600,754  2/1997  Gardner et al. ........................ 395/2.3

Primary Examiner—Allen R. MacDonald
Assistant Examiner—Alphonso A. Collins
Attorney, Agent, or Firm—Wayne J. Egan

[57] ABSTRACT

A method of transmitting voice coding information is provided. First and second frames of voice coding information are provided. Each frame is then prioritized based on which bits need to be forward-error corrected, thus forming first and second prioritized frames. A six-bit CRC value is then computed based on the prioritized first and second frames. The six-bit CRC value is then split into first and second 3-bit CRC units. The first CRC unit is then combined with the first prioritized frame to form a modified first frame, and the second CRC unit is then combined with the second prioritized frame to form a modified second frame. The modified first and second frames are each then error correction coded to form first and second sets of symbols, respectively. The first and second set of symbols are then interleaved into a transmission unit, which is then transmitted.

18 Claims, 16 Drawing Sheets

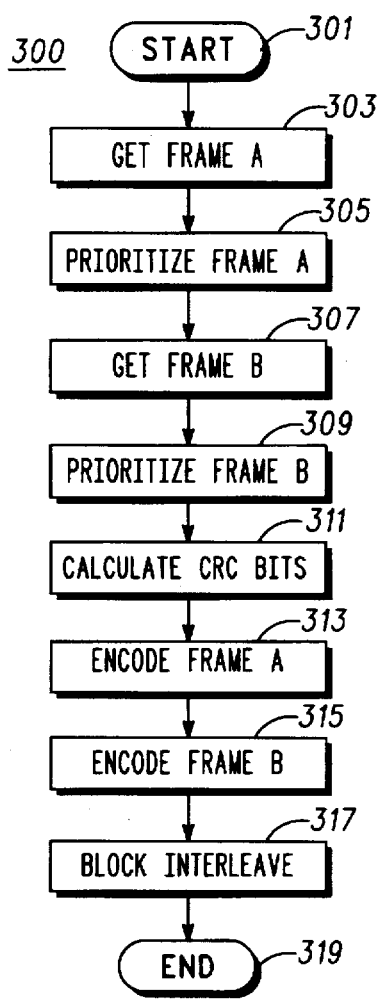
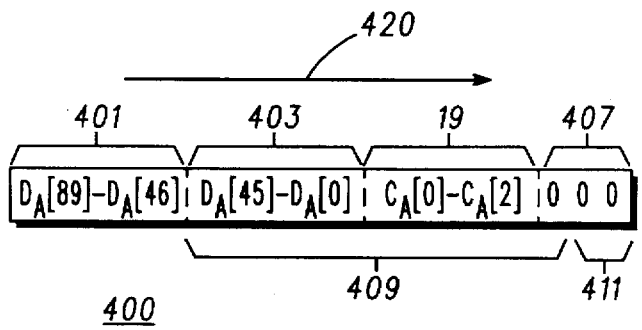
FIG.4
| CURRENT STATE | INPUT BIT=0 | INPUT BIT=1 |
|---|---|---|
| 0 | 0 | 1 |
| 1 | 2 | 3 |
| 2 | 4 | 5 |
| 3 | 6 | 7 |
| 4 | 0 | 1 |
| 5 | 2 | 3 |
| 6 | 4 | 5 |
| 7 | 6 | 7 |
FIG.3    FIG.6
| CLASS | NUMBER OF BITS | RANGE | CODING |
|---|---|---|---|
| I | 35 | $D_A[0]$-$D_A[34]$ | 1/3-RATE TCM w/CRC PROTECTION |
| II | 11 | $D_A[35]$-$D_A[45]$ | 1/3-RATE TCM |
| III | 44 | $D_A[46]$-$D_A[89]$ | 1/2-RATE TCM |
| IV | 40 | $D_A[90]$-$D_A[129]$ | UNCODED (TYPE 1) |
| V | 50 | $D_A[130]$-$D_A[179]$ | UNCODED (TYPE 2) |
| TOTAL | 180 | | |
FIG.5

| CURRENT STATE | INPUT BIT=0 | INPUT BIT=1 |
|---|---|---|
| 0 | +1 | -3 |
| 1 | +3 | -1 |
| 2 | -3 | +1 |
| 3 | -1 | +3 |
| 4 | -3 | +1 |
| 5 | -1 | +3 |
| 6 | +1 | -3 |
| 7 | +3 | -1 |

*FIG.7*

| CURRENT STATE | CODED BITS=0 CLASS V BIT=0 | CODED BITS=0 CLASS V BIT=1 | CODED BITS=1 CLASS V BIT=0 | CODED BITS=1 CLASS V BIT=1 |
|---|---|---|---|---|
| 0 | (-3, -3) | (-3, -1) | (+1, +3) | (+1, +1) |
| 1 | (-3, +3) | (-3, +1) | (+1, -3) | (+1, -1) |
| 2 | (-1, -3) | (-1, -1) | (+3, +3) | (+3, +1) |
| 3 | (-1, +3) | (-1, +1) | (+3, -3) | (+3, -1) |
| 4 | (+1, +3) | (+1, +1) | (-3, -3) | (-3, -1) |
| 5 | (+1, -3) | (+1, -1) | (-3, +3) | (-3, +1) |
| 6 | (+3, +3) | (+3, +1) | (-1, -3) | (-1, -1) |
| 7 | (+3, -3) | (+3, -1) | (-1, +3) | (-1, +1) |

*FIG.8*

| UNCODED BITS MSB--LSB | OUTPUT COMPLEX SYMBOL | UNCODED BITS MSB--LSB | OUTPUT COMPLEX SYMBOL |
|---|---|---|---|
| 0000 | (+3, +3) | 1000 | (-3, +3) |
| 0001 | (+3, +1) | 1001 | (-3, +1) |
| 0010 | (+3, -3) | 1010 | (-3, -3) |
| 0011 | (+3, -1) | 1011 | (-3, -1) |
| 0100 | (+1, +3) | 1100 | (-1, +3) |
| 0101 | (+1, +1) | 1101 | (-1, +1) |
| 0110 | (+1, -3) | 1110 | (-1, -3) |
| 0111 | (+1, -1) | 1111 | (-1, -1) |

*FIG. 9*

| BITS (MSB-LSB) | NUMBER OF BITS | TYPE |
| --- | --- | --- |
| b0 - b4 | 5 | R0 |
| b5 - b15 | 11 | LPC1 |
| b16 - b24 | 9 | LPC2 |
| b25 - b32 | 8 | LPC3 |
| b33 | 1 | SOFT_INT |
| b34 - b35 | 2 | MODE |
| b36 - b42 | 7 | CODE1 (SUBFRAME1) |
| b43 - b49 | 7 | CODE2 (SUBFRAME1) |
| b50 - b56 | 7 | CODE3 (SUBFRAME1) |
| b57 - b63 | 7 | GSP0 (SUBFRAME1) |
| b64 - b70 | 7 | CODE1 (SUBFRAME2) |
| b71 - b77 | 7 | CODE2 (SUBFRAME2) |
| b78 - b84 | 7 | CODE3 (SUBFRAME2) |
| b85 - b91 | 7 | GSP0 (SUBFRAME2) |
| b92 - b98 | 7 | CODE1 (SUBFRAME3) |
| b99 - b105 | 7 | CODE2 (SUBFRAME3) |
| b106 - b112 | 7 | CODE3 (SUBFRAME3) |
| b113 - b119 | 7 | GSP0 (SUBFRAME3) |
| b120 - b126 | 7 | CODE1 (SUBFRAME4) |
| b127 - b133 | 7 | CODE2 (SUBFRAME4) |
| b134 - b140 | 7 | CODE3 (SUBFRAME4) |
| b141 - b147 | 7 | GSP0 (SUBFRAME4) |
| b148 - b154 | 7 | CODE1 (SUBFRAME5) |
| b155 - b161 | 7 | CODE2 (SUBFRAME5) |
| b162 - b168 | 7 | CODE3 (SUBFRAME5) |
| b169 - b175 | 7 | GSP0 (SUBFRAME5) |
| b176 - b179 | 4 | ZEROS (0 FILLED) |
| TOTAL | 180 | |

*FIG.10*

| BITS (MSB-LSB) | NUMBER OF BITS | TYPE |
|---|---|---|
| b0 - b4 | 5 | R0 |
| b5 - b15 | 11 | LPC1 |
| b16 - b24 | 9 | LPC2 |
| b25 - b32 | 8 | LPC3 |
| b33 | 1 | SOFT_INT |
| b34 - b35 | 2 | MODE |
| b36 - b39 | 4 | LAG (SUBFRAME1) |
| b40 - b48 | 9 | CODE1 (SUBFRAME1) |
| b49 - b57 | 9 | CODE2 (SUBFRAME1) |
| b58 - b63 | 6 | GSP0 (SUBFRAME1) |
| b64 - b67 | 4 | LAG (SUBFRAME2) |
| b68 - b76 | 9 | CODE1 (SUBFRAME2) |
| b77 - b85 | 9 | CODE2 (SUBFRAME2) |
| b86 - b91 | 6 | GSP0 (SUBFRAME2) |
| b92 - b99 | 8 | LAG (SUBFRAME3) |
| b100 - b108 | 9 | CODE1 (SUBFRAME3) |
| b109 - b117 | 9 | CODE2 (SUBFRAME3) |
| b118 - b123 | 6 | GSP0 (SUBFRAME3) |
| b124 - b127 | 4 | LAG (SUBFRAME4) |
| b128 - b136 | 9 | CODE1 (SUBFRAME4) |
| b137 - b145 | 9 | CODE2 (SUBFRAME4) |
| b146 - b151 | 6 | GSP0 (SUBFRAME4) |
| b152 - b155 | 4 | LAG (SUBFRAME5) |
| b156 - b164 | 9 | CODE1 (SUBFRAME5) |
| b165 - b173 | 9 | CODE2 (SUBFRAME5) |
| b174 - b179 | 6 | GSP0 (SUBFRAME5) |
| TOTAL | 180 | |

*FIG.11*

| SENSITIVITY INDEX | BIT TYPE | VSELP BIT INDEX | SENSITIVITY INDEX | BIT TYPE | VSELP BIT INDEX |
|---|---|---|---|---|---|
| 0 | MODE(1) | 34 | 90 | CODE1_1(4) | 38 |
| 1 | MODE(0) | 35 | 91 | CODE1_1(3) | 39 |
| 2 | R0(4) | 0 | 92 | CODE1_1(2) | 40 |
| 3 | R0(3) | 1 | 93 | CODE1_1(1) | 41 |
| 4 | LPC1(10) | 5 | 94 | CODE1_1(0) | 42 |
| 5 | LPC1(9) | 6 | 95 | CODE2_1(4) | 45 |
| 6 | LPC1(8) | 7 | 96 | CODE2_1(3) | 46 |
| 7 | LPC1(7) | 8 | 97 | CODE2_1(2) | 47 |
| 8 | LPC1(6) | 9 | 98 | CODE2_1(1) | 48 |
| 9 | R0(2) | 2 | 99 | CODE2_1(0) | 49 |
| 10 | LPC1(5) | 10 | 100 | CODE3_1(4) | 52 |
| 11 | LPC1(4) | 11 | 101 | CODE3_1(3) | 53 |
| 12 | LPC1(3) | 12 | 102 | CODE3_1(2) | 54 |
| 13 | LPC1(2) | 13 | 103 | CODE3_1(1) | 55 |
| 14 | LPC2(8) | 16 | 104 | CODE3_1(0) | 56 |
| 15 | LPC2(7) | 17 | 105 | CODE1_2(4) | 66 |
| 16 | LPC2(6) | 18 | 106 | CODE1_2(3) | 67 |
| 17 | GSP0_1(6) | 57 | 107 | CODE1_2(2) | 68 |
| 18 | GSP0_2(6) | 85 | 108 | CODE1_2(1) | 69 |
| 19 | GSP0_3(6) | 113 | 109 | CODE1_2(0) | 70 |
| 20 | GSP0_4(6) | 141 | 110 | CODE2_2(5) | 72 |

*FIG.12A*

| SENSITIVITY INDEX | BIT TYPE | VSELP BIT INDEX | SENSITIVITY INDEX | BIT TYPE | VSELP BIT INDEX |
|---|---|---|---|---|---|
| 21 | GSP0_5(6) | 169 | 111 | CODE2_2(4) | 73 |
| 22 | R0(1) | 3 | 112 | CODE2_2(3) | 74 |
| 23 | LPC1(1) | 14 | 113 | CODE2_2(2) | 75 |
| 24 | LPC1(0) | 15 | 114 | CODE2_2(1) | 76 |
| 25 | LPC2(5) | 19 | 115 | CODE2_2(0) | 77 |
| 26 | LPC2(4) | 20 | 116 | CODE3_2(5) | 79 |
| 27 | LPC2(3) | 21 | 117 | CODE3_2(4) | 80 |
| 28 | LPC3(7) | 25 | 118 | CODE3_2(3) | 81 |
| 29 | LPC3(6) | 26 | 119 | CODE3_2(2) | 82 |
| 30 | LPC3(5) | 27 | 120 | CODE3_2(1) | 83 |
| 31 | GSP0_1(5) | 58 | 121 | CODE3_2(0) | 84 |
| 32 | GSP0_2(5) | 86 | 122 | CODE1_3(5) | 93 |
| 33 | GSP0_3(5) | 114 | 123 | CODE1_3(4) | 94 |
| 34 | GSP0_4(5) | 142 | 124 | CODE1_3(3) | 95 |
| 35 | GSP0_5(5) | 170 | 125 | CODE1_3(2) | 96 |
| 36 | GSP0_1(4) | 59 | 126 | CODE1_3(1) | 97 |
| 37 | GSP0_2(4) | 87 | 127 | CODE1_3(0) | 98 |
| 38 | GSP0_3(4) | 115 | 128 | CODE2_3(5) | 100 |
| 39 | GSP0_4(4) | 143 | 129 | CODE2_3(4) | 101 |
| 40 | GSP0_5(4) | 171 | 130 | CODE2_3(3) | 102 |
| 41 | LPC2(2) | 22 | 131 | CODE2_3(2) | 103 |
| 42 | LPC2(1) | 23 | 132 | CODE2_3(1) | 104 |
| 43 | LPC3(4) | 28 | 133 | CODE3_3(0) | 105 |
| 44 | LPC3(3) | 29 | 134 | CODE3_3(5) | 107 |
| 45 | SOFT INT | 33 | 135 | CODE3_3(4) | 108 |
| 46 | R0(0) | 4 | 136 | CODE3_3(3) | 109 |
| 47 | LPC2(0) | 24 | 137 | CODE3_3(2) | 110 |
| 48 | LPC3(2) | 30 | 138 | CODE3_3(1) | 111 |
| 49 | LPC3(1) | 31 | 139 | CODE3_3(0) | 112 |
| 50 | GSP0_3(0) | 32 | 140 | CODE1_4(5) | 121 |

*FIG. 12B*

| SENSITIVITY INDEX | BIT TYPE | VSELP BIT INDEX | SENSITIVITY INDEX | BIT TYPE | VSELP BIT INDEX |
|---|---|---|---|---|---|
| 51 | GSP0_1(3) | 60 | 141 | CODE1_4(4) | 122 |
| 52 | GSP0_2(3) | 88 | 142 | CODE1_4(3) | 123 |
| 53 | GSP0_3(3) | 116 | 143 | CODE1_4(2) | 124 |
| 54 | GSP0_4(3) | 144 | 144 | CODE1_4(1) | 125 |
| 55 | GSP0_5(3) | 172 | 145 | CODE1_4(0) | 126 |
| 56 | GSP0_1(2) | 61 | 146 | CODE2_4(5) | 128 |
| 57 | GSP0_2(2) | 89 | 147 | CODE2_4(4) | 129 |
| 58 | GSP0_3(2) | 117 | 148 | CODE2_4(3) | 130 |
| 59 | GSP0_4(2) | 145 | 149 | CODE2_4(2) | 131 |
| 60 | GSP0_5(2) | 173 | 150 | CODE2_4(1) | 132 |
| 61 | GSP0_1(1) | 62 | 151 | CODE3_4(0) | 133 |
| 62 | GSP0_2(1) | 90 | 152 | CODE3_4(5) | 135 |
| 63 | GSP0_3(1) | 118 | 153 | CODE3_4(4) | 136 |
| 64 | GSP0_4(1) | 146 | 154 | CODE3_4(3) | 137 |
| 65 | GSP0_5(1) | 174 | 155 | CODE3_4(2) | 138 |
| 66 | GSP0_1(0) | 63 | 156 | CODE3_4(1) | 139 |
| 67 | GSP0_2(0) | 91 | 157 | CODE3_4(0) | 140 |
| 68 | GSP0_3(0) | 119 | 158 | CODE1_5(5) | 149 |
| 69 | GSP0_4(0) | 147 | 159 | CODE1_5(4) | 150 |
| 70 | GSP0_5(0) | 175 | 160 | CODE1_5(3) | 151 |
| 71 | CODE1_1(6) | 36 | 161 | CODE1_5(2) | 152 |
| 72 | CODE2_1(6) | 43 | 162 | CODE1_5(1) | 153 |
| 73 | CODE3_1(6) | 50 | 163 | CODE1_5(0) | 154 |
| 74 | CODE1_2(6) | 64 | 164 | CODE2_5(5) | 156 |
| 75 | CODE2_2(6) | 71 | 165 | CODE2_5(4) | 157 |
| 76 | CODE3_2(6) | 78 | 166 | CODE2_5(3) | 158 |
| 77 | CODE1_3(6) | 92 | 167 | CODE2_5(2) | 159 |
| 78 | CODE2_3(6) | 99 | 168 | CODE2_5(1) | 160 |
| 79 | CODE3_3(6) | 106 | 169 | CODE3_5(0) | 161 |
| 80 | CODE1_4(6) | 120 | 170 | CODE3_5(5) | 163 |

*FIG. 12C*

| SENSITIVITY INDEX | BIT TYPE | VSELP BIT INDEX | SENSITIVITY INDEX | BIT TYPE | VSELP BIT INDEX |
|---|---|---|---|---|---|
| 81 | CODE2_4(6) | 127 | 171 | CODE3_5(4) | 164 |
| 82 | CODE3_4(6) | 134 | 172 | CODE3_5(3) | 165 |
| 83 | CODE1_5(6) | 148 | 173 | CODE3_5(2) | 166 |
| 84 | CODE2_5(6) | 155 | 174 | CODE3_5(1) | 167 |
| 85 | CODE3_5(6) | 162 | 175 | CODE3_5(0) | 168 |
| 86 | CODE1_1(5) | 37 | 176 | 0 | 176 |
| 87 | CODE2_1(5) | 44 | 177 | 0 | 177 |
| 88 | CODE3_1(5) | 51 | 178 | 0 | 178 |
| 89 | CODE1_2(5) | 65 | 179 | 0 | 179 |

*FIG. 12D*

| SENSITIVITY INDEX | BIT TYPE | VSELP BIT INDEX | SENSITIVITY INDEX | BIT TYPE | VSELP BIT INDEX |
|---|---|---|---|---|---|
| 0 | MODE(1) | 34 | 90 | CODE1_1(8) | 40 |
| 1 | MODE(0) | 33 | 91 | CODE1_1(7) | 41 |
| 2 | R0(4) | 0 | 92 | CODE1_1(6) | 42 |
| 3 | R0(3) | 1 | 93 | CODE1_1(5) | 43 |
| 4 | LPC1(10) | 5 | 94 | CODE1_1(4) | 44 |
| 5 | LPC1(9) | 6 | 95 | CODE1_1(3) | 45 |
| 6 | LPC1(8) | 7 | 96 | CODE1_1(2) | 46 |
| 7 | LPC1(7) | 8 | 97 | CODE1_1(1) | 47 |
| 8 | LPC1(6) | 9 | 98 | CODE1_1(0) | 48 |
| 9 | LPC1(5) | 10 | 99 | CODE2_1(8) | 49 |
| 10 | R0(2) | 2 | 100 | CODE2_1(7) | 50 |
| 11 | LAG_3(7) | 92 | 101 | CODE2_1(6) | 51 |
| 12 | LAG_3(6) | 93 | 102 | CODE2_1(5) | 52 |
| 13 | LAG_3(5) | 94 | 103 | CODE2_1(4) | 53 |
| 14 | LAG_3(4) | 95 | 104 | CODE2_1(3) | 54 |
| 15 | LAG_3(3) | 96 | 105 | CODE2_1(2) | 55 |
| 16 | LPC2(8) | 16 | 106 | CODE2_1(1) | 56 |
| 17 | LPC1(4) | 11 | 107 | CODE2_1(0) | 57 |
| 18 | LPC1(3) | 12 | 108 | CODE1_2(8) | 68 |
| 19 | LPC2(7) | 17 | 109 | CODE1_2(7) | 69 |
| 20 | LPC1(2) | 13 | 110 | CODE1_2(6) | 70 |
| 21 | LPC1(1) | 14 | 111 | CODE1_2(5) | 71 |
| 22 | LPC1(0) | 15 | 112 | CODE1_2(4) | 72 |
| 23 | LPC2(6) | 18 | 113 | CODE1_2(3) | 73 |
| 24 | LPC2(5) | 19 | 114 | CODE1_2(2) | 74 |
| 25 | LPC2(4) | 20 | 115 | CODE1_2(1) | 75 |
| 26 | LPC2(3) | 21 | 116 | CODE1_2(0) | 76 |
| 27 | LAG_2(3) | 64 | 117 | CODE2_2(8) | 77 |
| 28 | LAG_3(2) | 97 | 118 | CODE2_2(7) | 79 |
| 29 | LAG_4(3) | 124 | 119 | CODE2_2(6) | 78 |

*FIG. 13A*

| SENSITIVITY INDEX | BIT TYPE | VSELP BIT INDEX | SENSITIVITY INDEX | BIT TYPE | VSELP BIT INDEX |
|---|---|---|---|---|---|
| 30 | LAG_1(3) | 36 | 120 | CODE2_2(5) | 80 |
| 31 | LAG_5(3) | 152 | 121 | CODE2_2(4) | 81 |
| 32 | R0(1) | 3 | 122 | CODE2_2(3) | 82 |
| 33 | GSP0_1(5) | 58 | 123 | CODE2_2(2) | 83 |
| 34 | GSP0_2(5) | 86 | 124 | CODE2_2(1) | 84 |
| 35 | GSP0_3(5) | 118 | 125 | CODE2_2(0) | 85 |
| 36 | GSP0_4(5) | 146 | 126 | CODE1_3(8) | 100 |
| 37 | GSP0_5(5) | 174 | 127 | CODE1_3(7) | 101 |
| 38 | LPC3(7) | 25 | 128 | CODE1_3(6) | 102 |
| 39 | LPC3(6) | 26 | 129 | CODE1_3(5) | 103 |
| 40 | LPC3(5) | 27 | 130 | CODE1_3(4) | 104 |
| 41 | LPC3(4) | 28 | 131 | CODE1_3(3) | 105 |
| 42 | LAG_2(2) | 65 | 132 | CODE1_3(2) | 106 |
| 43 | LAG_4(2) | 125 | 133 | CODE1_3(1) | 107 |
| 44 | LAG_1(2) | 37 | 134 | CODE1_3(0) | 108 |
| 45 | LAG_5(2) | 153 | 135 | CODE2_3(8) | 109 |
| 46 | GSP0_1(4) | 59 | 136 | CODE2_3(7) | 110 |
| 47 | GSP0_2(4) | 87 | 137 | CODE2_3(6) | 111 |
| 48 | GSP0_3(4) | 119 | 138 | CODE2_3(5) | 112 |
| 49 | GSP0_4(4) | 147 | 139 | CODE2_3(4) | 113 |
| 50 | GSP0_5(4) | 175 | 140 | CODE2_3(3) | 114 |
| 51 | LPC2(2) | 22 | 141 | CODE2_3(2) | 115 |
| 52 | R0(0) | 4 | 142 | CODE2_3(1) | 116 |
| 53 | SOFT INT | 33 | 143 | CODE2_3(0) | 117 |
| 54 | LAG_3(1) | 98 | 144 | CODE1_4(8) | 128 |
| 55 | LAG_2(1) | 66 | 145 | CODE1_4(7) | 129 |
| 56 | LAG_4(1) | 126 | 146 | CODE1_4(6) | 130 |
| 57 | LAG_3(0) | 99 | 147 | CODE1_4(5) | 131 |
| 58 | LPC2(1) | 23 | 148 | CODE1_4(4) | 132 |
| 59 | LPC2(0) | 24 | 149 | CODE1_4(3) | 133 |

*FIG. 13B*

| SENSITIVITY INDEX | BIT TYPE | VSELP BIT INDEX | SENSITIVITY INDEX | BIT TYPE | VSELP BIT INDEX |
|---|---|---|---|---|---|
| 60 | LPC3(3) | 29 | 150 | CODE1_4(2) | 134 |
| 61 | LPC3(2) | 30 | 151 | CODE1_4(1) | 135 |
| 62 | LPC3(1) | 31 | 152 | CODE1_4(0) | 136 |
| 63 | LPC3(0) | 32 | 153 | CODE2_4(8) | 137 |
| 64 | LAG_5(1) | 154 | 154 | CODE2_4(7) | 138 |
| 65 | LAG_1(1) | 38 | 155 | CODE2_4(6) | 139 |
| 66 | GSP0_1(3) | 60 | 156 | CODE2_4(5) | 140 |
| 67 | GSP0_2(3) | 88 | 157 | CODE2_4(4) | 141 |
| 68 | GSP0_3(3) | 120 | 158 | CODE2_4(3) | 142 |
| 69 | GSP0_4(3) | 148 | 159 | CODE2_4(2) | 143 |
| 70 | GSP0_5(3) | 176 | 160 | CODE2_4(1) | 144 |
| 71 | GSP0_1(2) | 61 | 161 | CODE2_4(0) | 145 |
| 72 | GSP0_2(2) | 89 | 162 | CODE1_5(8) | 156 |
| 73 | GSP0_3(2) | 121 | 163 | CODE1_5(7) | 157 |
| 74 | GSP0_4(2) | 149 | 164 | CODE1_5(6) | 158 |
| 75 | GSP0_5(2) | 177 | 165 | CODE1_5(5) | 159 |
| 76 | LAG_1(0) | 39 | 166 | CODE1_5(4) | 160 |
| 77 | LAG_2(0) | 67 | 167 | CODE1_5(3) | 161 |
| 78 | LAG_4(0) | 127 | 168 | CODE1_5(2) | 162 |
| 79 | LAG_5(0) | 155 | 169 | CODE1_5(1) | 163 |
| 80 | GSP0_1(1) | 62 | 170 | CODE1_5(0) | 164 |
| 81 | GSP0_2(1) | 90 | 171 | CODE2_5(8) | 165 |
| 82 | GSP0_3(1) | 122 | 172 | CODE2_5(7) | 166 |
| 83 | GSP0_4(1) | 150 | 173 | CODE2_5(6) | 167 |
| 84 | GSP0_5(1) | 178 | 174 | CODE2_5(5) | 168 |
| 85 | GSP0_1(0) | 63 | 175 | CODE2_5(4) | 169 |
| 86 | GSP0_2(0) | 91 | 176 | CODE2_5(3) | 170 |
| 87 | GSP0_3(0) | 123 | 177 | CODE2_5(2) | 171 |
| 88 | GSP0_4(0) | 151 | 178 | CODE2_5(1) | 172 |
| 89 | GSP0_5(0) | 179 | 179 | CODE2_5(0) | 173 |

*FIG.13C*

| INITIAL SS INDEX | INTERLEAVED SS INDEX | INITIAL SS INDEX | INTERLEAVED SS INDEX | INITIAL SS INDEX | INTERLEAVED SS INDEX | INITIAL SS INDEX | INTERLEAVED SS INDEX |
|---|---|---|---|---|---|---|---|
| 0 | 0 | 42 | 29 | 84 | 28 | 126 | 31 |
| 1 | 30 | 43 | 56 | 85 | 58 | 127 | 57 |
| 2 | 59 | 44 | 86 | 86 | 87 | 128 | 84 |
| 3 | 85 | 45 | 115 | 87 | 113 | 129 | 114 |
| 4 | 112 | 46 | 141 | 88 | 140 | 130 | 143 |
| 5 | 142 | 47 | 4 | 89 | 6 | 131 | 5 |
| 6 | 7 | 48 | 34 | 90 | 35 | 132 | 32 |
| 7 | 33 | 49 | 63 | 91 | 61 | 133 | 62 |
| 8 | 60 | 50 | 89 | 92 | 88 | 134 | 91 |
| 9 | 90 | 51 | 116 | 93 | 118 | 135 | 117 |
| 10 | 119 | 52 | 146 | 94 | 147 | 136 | 144 |
| 11 | 145 | 53 | 11 | 95 | 9 | 137 | 10 |
| 12 | 8 | 54 | 37 | 96 | 36 | 138 | 39 |
| 13 | 38 | 55 | 64 | 97 | 66 | 139 | 65 |
| 14 | 67 | 56 | 94 | 98 | 95 | 140 | 92 |
| 15 | 93 | 57 | 123 | 99 | 121 | 141 | 122 |
| 16 | 120 | 58 | 149 | 100 | 148 | 142 | 151 |
| 17 | 150 | 59 | 12 | 101 | 14 | 143 | 13 |
| 18 | 15 | 60 | 42 | 102 | 43 | 144 | 40 |
| 19 | 41 | 61 | 71 | 103 | 69 | 145 | 70 |
| 20 | 68 | 62 | 97 | 104 | 96 | 146 | 99 |
| 21 | 98 | 63 | 124 | 105 | 126 | 147 | 125 |
| 22 | 127 | 64 | 154 | 106 | 155 | 148 | 152 |
| 23 | 153 | 65 | 19 | 107 | 17 | 149 | 18 |
| 24 | 16 | 66 | 45 | 108 | 44 | 150 | 47 |
| 25 | 46 | 67 | 72 | 109 | 74 | 151 | 73 |
| 26 | 75 | 68 | 102 | 110 | 103 | 152 | 100 |
| 27 | 101 | 69 | 131 | 111 | 129 | 153 | 130 |
| 28 | 128 | 70 | 157 | 112 | 156 | 154 | 159 |
| 29 | 158 | 71 | 20 | 113 | 22 | 155 | 21 |

*FIG. 14A*

| INITIAL SS INDEX | INTERLEAVED SS INDEX | INITIAL SS INDEX | INTERLEAVED SS INDEX | INITIAL SS INDEX | INTERLEAVED SS INDEX | INITIAL SS INDEX | INTERLEAVED SS INDEX |
|---|---|---|---|---|---|---|---|
| 30 | 23 | 72 | 50 | 114 | 51 | 156 | 48 |
| 31 | 49 | 73 | 79 | 115 | 77 | 157 | 78 |
| 32 | 76 | 74 | 105 | 116 | 104 | 158 | 107 |
| 33 | 106 | 75 | 132 | 117 | 134 | 159 | 133 |
| 34 | 135 | 76 | 162 | 118 | 163 | 160 | 160 |
| 35 | 161 | 77 | 27 | 119 | 25 | 161 | 26 |
| 36 | 24 | 78 | 53 | 120 | 52 | 162 | 55 |
| 37 | 54 | 79 | 80 | 121 | 82 | 163 | 81 |
| 38 | 83 | 80 | 110 | 122 | 111 | 164 | 108 |
| 39 | 109 | 81 | 139 | 123 | 137 | 165 | 138 |
| 40 | 136 | 82 | 165 | 124 | 164 | | |
| 41 | 3 | 83 | 1 | 125 | 2 | | |

FIG.14B

METHOD OF TRANSMITTING VOICE CODING INFORMATION USING CYCLIC REDUNDANCY CHECK BITS

CROSS-REFERENCE TO RELATED CO-PENDING APPLICATION

The present application is related to a co-pending application, Ser. No. 08/551,103, entitled "Method and Apparatus for the Provision and Reception of Symbols," by Gregory Charles White, Stephen Paul Emeott, John G. Ronk, and Patrick Joseph Doran, which co-pending application is being filed on the same day herewith, which co-pending application is assigned to Motorola, Inc., and which co-pending application is hereby incorporated by reference verbatim, with the same effect as though the co-pending application were fully and completely set forth herein.

FIELD OF THE INVENTION

This application relates to a method of transmitting information including, but not limited to, a method of transmitting voice coding information.

BACKGROUND OF THE INVENTION

Voice transmissions for wireless two-way radio dispatch communications systems need error correction to combat channel transmission errors. As is known, one such wireless communication system is iDEN (integrated dispatch enhanced network), which is provided by Motorola, Inc. Typically error correction is done by introducing, through redundancy, a capability for the correction of channel transmission errors. In the case of a low bit-rate encoded speech system, often a subset of the data to be transmitted requires significant protection from channel errors, while the rest of the data requires less protection. The goal of the error control system is to provide adequate protection to the transmitted data in a very efficient manner.

Numerous error control methods exist, including interleaving, trellis coding, cyclic redundancy checks, and so forth.

Therefore, there is a need for an improved method of transmitting voice coding information.

BRIEF DESCRIPTION OF THE DRAWINGS

FIG. 3 shows a flow diagram in accordance with the invention.

FIG. 4 depicts a trellis-coded frame.

FIG. 5 shows forward error correction ("FEC") bit classification.

FIG. 6 shows ½ rate coder state update rules.

FIG. 7 shows ½ rate coder output symbol values.

FIG. 8 shows ⅓ rate coder output symbol values.

FIG. 9 shows ¼ rate output symbol values.

FIG. 10 shows 8000 bps vector sum excited linear prediction ("VSELP") vocoder unvoiced bit allocation values.

FIG. 11 shows 8000 bps VSELP vocoder voiced bit allocation values.

FIGS. 12(a) thru 12(c) shows unvoiced frame bit sensitivity values, where 0 is most sensitive.

FIGS. 13(a) thru 13(c) shows voiced frame bit sensitivity values, where 0 is most sensitive.

FIG. 14 shows a block interleaving pattern.

DESCRIPTION OF THE PREFERRED EMBODIMENT

As discussed in more detail below, the present invention provides error correction for data bits by transmitting complex modulation symbols that include various forms of correction. The invention may be understood with reference to FIGS. 1–2, which show a first embodiment of a method of transmitting voice coding information, in accordance with the invention.

Figure 1:
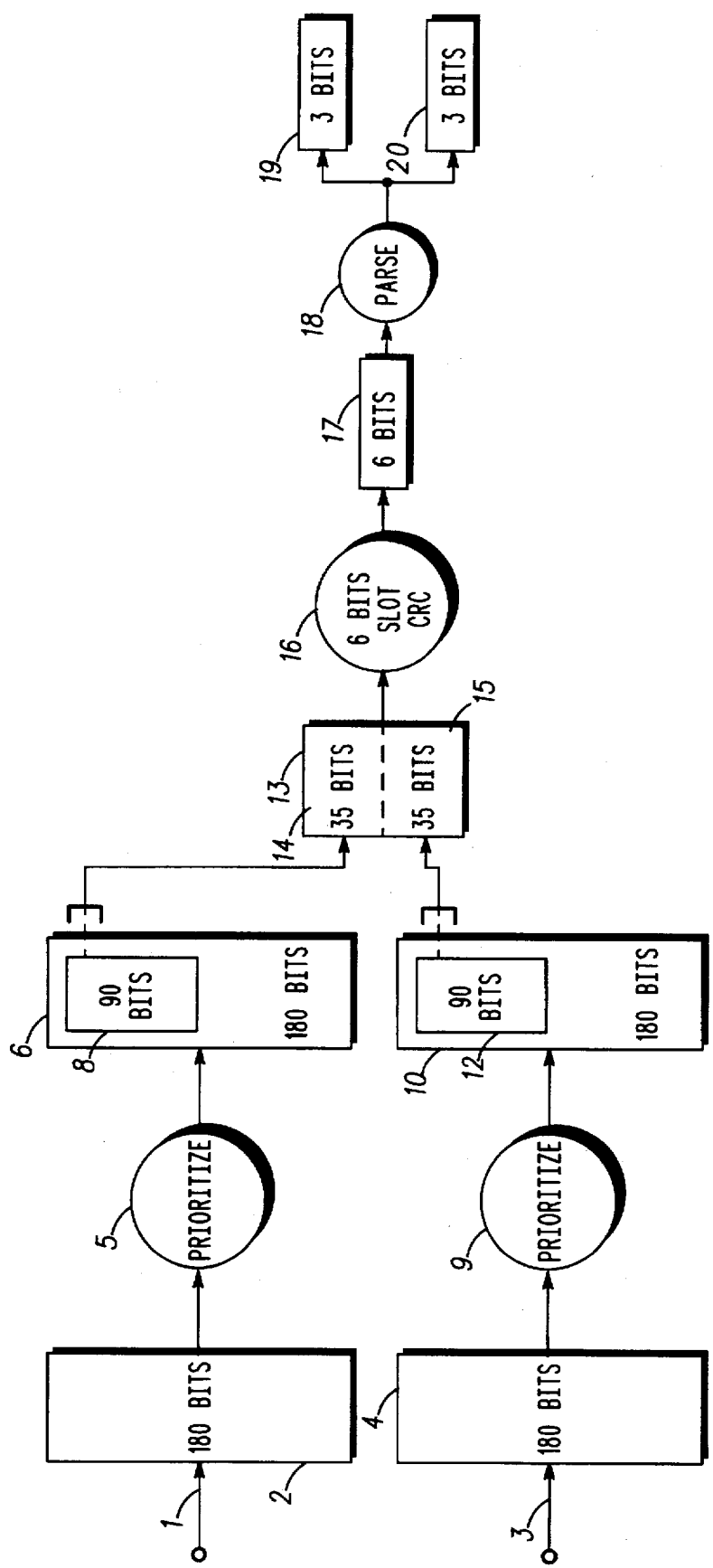
FIGS. 1–2 show a first embodiment of a method of transmitting voice coding information, in accordance with the invention.

Referring now to FIG. 1, there is provided 1 a first frame 2 of voice coding information, comprising a plurality of bits. There is also provided 3 a second frame 4 of voice coding information comprising a plurality of bits. As explained in more detail below, the elements 1 and 3 may comprise, for example, 3:1 VSELP speech encoder outputs.

The bits of the first frame 2 are then prioritized 5 to form a first prioritized frame 6 of voice coding information. Also, the bits of the second frame 4 are prioritized 9 to form a second prioritized frame 10 of voice coding information.

The method next forms a set of bits 13 comprising a first part 14 of the first prioritized frame 6 and a second part 15 of the second prioritized frame 10.

A single cyclical redundancy check ("CRC") value 17 is then computed 16, using the set of bits 13 formed above.

The method next parses 18 the single CRC value 17 into a first CRC unit 19 and a second CRC unit 20.

Figure 2:
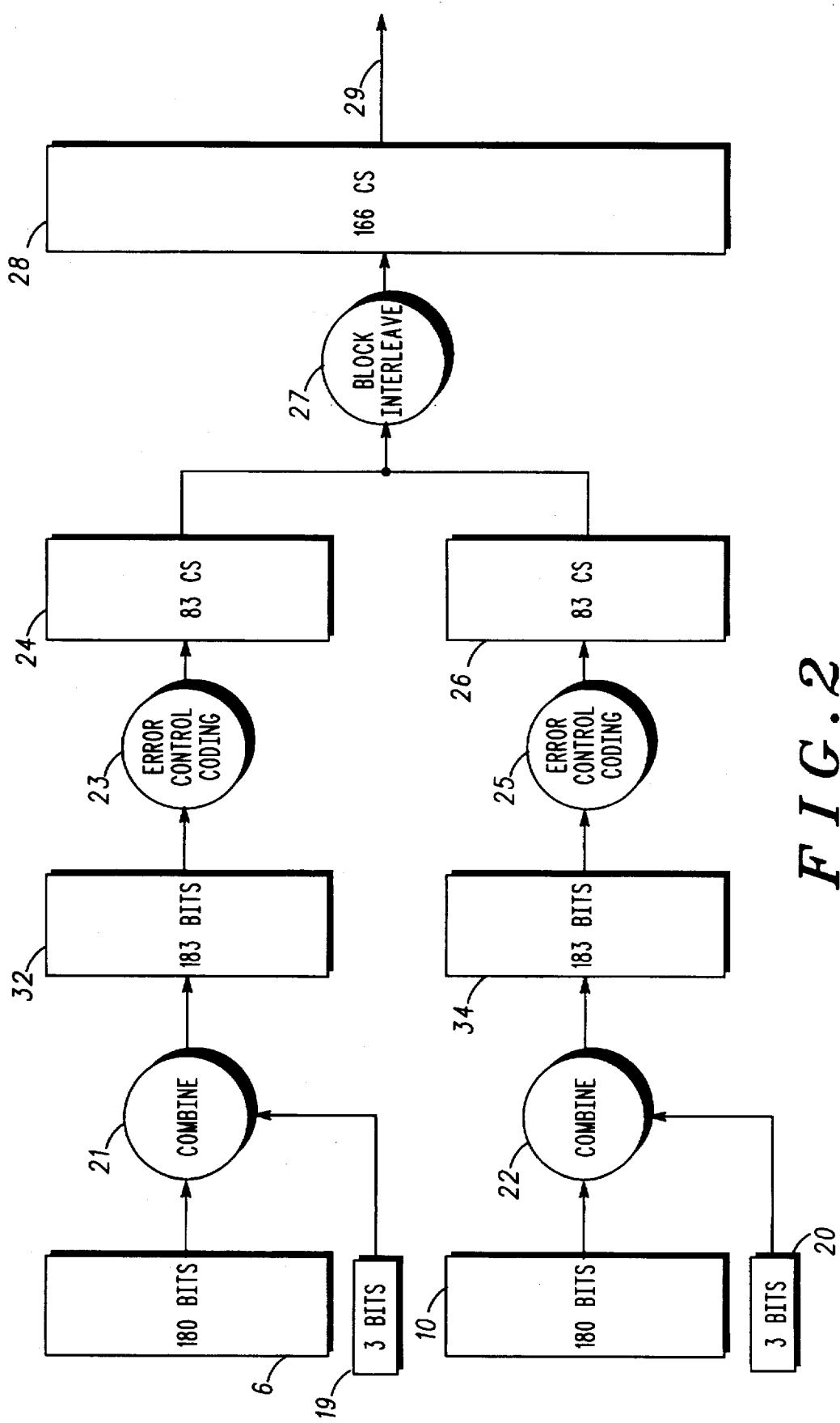

Referring now to FIG. 2, the first CRC unit 19 is then combined 21 with the first prioritized frame 6 to form a modified first frame 32. Also, the second CRC unit 20 is combined 22 with the second prioritized frame 10 to form a modified second frame 34.

The method next error correction codes 23 at least some of the bits of the modified first frame 32 to provide a first set of symbols 24. Also, the method error correction codes 25 at least some of the bits of the modified second frame 34 to provide a second set of symbols 26.

The first set of symbols 24 are then interleaved 27 with the second set of symbols 26 to provide a transmission unit 28.

The transmission unit 28 is then transmitted 29.

In one embodiment, the first frame 2 comprises 180 bits, and the second frame 4 comprises 180 bits.

In one embodiment, the above prioritizing step 5 comprises identifying bits from the first frame 2 that are to be forward error correction coded, thus forming a first group 8 of bits, the first group 8 comprising 90 bits.

In one embodiment, the above prioritizing step 9 comprises identifying bits from the second frame 4 that are to be forward error correction coded, thus forming a second group 12 of bits, the second group 12 comprising 90 bits.

In one embodiment, the set of bits 13 comprises 70 bits; the first part 14 comprises 35 bits, the first part being based on the first group 8; and the second part 15 comprises 35 bits, the second part being based on the second group 12.

In one embodiment, the single cyclical redundancy check value 17 comprises 6 bits, the first CRC unit 19 comprises 3 bits, and the second CRC unit 20 comprises 3 bits.

In one embodiment, the first set of symbols 24 comprises 83 symbols, the second set of symbols 26 comprises 83 symbols, and the transmission unit 28 comprises 166 symbols.

In one embodiment, the modified first frame 32 comprises 183 bits, and the modified second frame 34 comprises 183 bits.

Referring now to FIG. 3, there is shown a flow diagram 300, comprising steps 301–319, for an embodiment of the present invention arranged to provide error correction for the data bits of a 8000 bits-per-second VSELP vocoder.

For background information on VSELP, the reader is directed to the following U.S. Patents: U.S. Pat. No. 4,817, 157, Gerson, Ira A., "Digital speech coder having improved vector excitation source," Mar. 28, 1989; U.S. Pat. No. 4,896,361, Gerson, Ira A., "Digital speech coder having improved vector excitation source," Jan. 23, 1990; U.S. Pat. No. 5,265,219, Gerson, Ira A. et al., "Speech encoder using a soft interpolation decision for spectral parameters," Nov. 23, 1993; and U.S. Pat. No. 5,359,696, Gerson, Ira A. et al., "Digital speech coder having improved sub-sample resolution long-term predictor," Oct. 25, 1994.

The result of the steps 301–319 is the 166-symbol transmission unit depicted as element 28 in FIG. 2.

The process starts 301, and then proceeds to step 303, "Get Frame A." It will be understood that Frame A corresponds to the frame 2 depicted in FIG. 1. Here the 3:1 VSELP speech encoder outputs a sequence of data blocks (speech frames) where each block corresponds to 22.5 ms of speech and contains 26 parameters for a total of 180 bits.

The speech encoder produces the parameters in a unique sequence and format, and the decoder must receive the parameters in the same format. FIGS. 10–11 list the sequence of parameters and the bit allocation for each parameter. The sequence depends on the mode associated with the encoded speech frame. FIG. 10 lists the sequence for an unvoiced frame (MODE=0) and FIG. 11 lists the sequence for a voiced frame (MODE=1, 2 or 3). This step is depicted as element 1 in FIG. 1.

The process next goes to step 305, "Prioritize Frame A." The different parameters of the encoded speech and their individual bits have unequal importance with respect to subjective speech quality. FIGS. 12(a) thru 12 (c) ranks the subjective importance of each of the bits in unvoiced frames and FIGS. 13(a) thru 13(c) ranks the subjective importance of each of the bits in voiced frames. The ranking was determined by comparative listening tests of a 15-second speech segment having the bit of interest inverted. In this step, the bits of frame 2 are reorganized (or prioritized) according to the appropriate "bit sensitivity" list to form a new data block $D_A$, with $D_A[0]$ being the most sensitive bit, and $D_A[179]$ being the least sensitive. The bits are then classified into five importance classes as shown in FIG. 5. Thus, the 35 most sensitive bits are considered Class I, the subsequent 11 most sensitive bits are considered Class II, and so on. In FIG. 1, this prioritizing step is depicted as element 5, with the resulting prioritized Frame A being depicted as element 6.

The process next goes to step 307, "Get Frame B." It will be understood that Frame B corresponds to the frame 4 depicted in FIG. 1. This step is identical to step 303, "Get Frame A," described above. This step is depicted as element 3 in FIG. 1.

The process next goes to step 309, "Prioritize Frame B." This step is identical to step 305, "Prioritize Frame A," described above. The results of this step is a string of bits $D_B[0 \ldots 179]$ where $D_B[0]$ is the most sensitive, and $D_B[179]$ is the least sensitive. In FIG. 1, this prioritizing step is depicted as element 9, with the resulting prioritized Frame B being depicted as element 10.

The process next goes to step 311, "Calculate CRC bits." This step is based on the 35-bit Class I portion of the prioritized Frame A and the 35-bit Class I portion of the prioritized Frame B. Here, the two 35-bit Class I portions of the two prioritized speech frames, namely, $D_A[0 \ldots 34]$ (depicted as element 14 in FIG. 1) and $D_B[0 \ldots 34]$) (depicted as element 15 in FIG. 1) are concatenated to form a 70-bit set of bits (depicted as element 13 in FIG. 1) for the purpose of calculating the 6-bit CRC value. This set of bits $C_i[0 \ldots 69]=D_A[0] \ldots D_A[34] \, D_{B[0]} \ldots D_B[34]$ is used to calculate the CRC codeword Co. The CRC generator polynomial is defined as $1+x^5+x^6$. The resulting 6-bit CRC codeword Co is depicted as element 17 in FIG. 1.

The 6-bit CRC codeword Co is split (depicted as element 18 in FIG. 1) into two 3-bit CRC units to be inserted into the prioritized Frames A and B prior to trellis coding. The two CRC units $C_A$ and $C_B$ are formed from the codeword as follows: the first CRC unit, $C_A[0 \ldots 2]=C_0[0 \ldots 2]$, and the second CRC unit, $C_B[0 \ldots 2]=C_0[3 \ldots 5]$, where $C_0[0]$ is the oldest bit and $C_0[5]$ is the newest bit of the CRC codeword $C_0$. With cross-reference to FIG. 1, the first CRC unit, $C_A$, is depicted as element 19 and the second CRC unit, $C_B$, is depicted as element 20.

Referring momentarily to FIG. 2, the 3-bit first CRC unit (element 19) is next combined (element 21) with the 180-bit prioritized Frame A (element 6) to form a 183-bit modified first frame (element 32). Also, the second 3-bit CRC unit (element 20) is next combined (element 22) with the 180-bit prioritized Frame B (element 10) to form a 183-bit modified second frame (element 34).

Returning now to FIG. 3, the process next goes to step 313, "Encode Frame A," which corresponds to element 23 in FIG. 2. Here, the Class I, II, and III portions of the modified speech frame 32, including the first CRC unit 19, and three flush bits {0,0,0} are trellis encoded at the rates indicated in FIG. 5, with the three CRC bits 19 and one of the flush bits encoded at rate ⅓, and the final 2 flush bits encoded at rate ½. This trellis coding step 23 results in a first set of 83 symbols depicted as 24 in FIG. 2.

The portion of the data to be Trellis Code Modulation ("TCM") coded is processed through a multi-rate, eight-state trellis, beginning with the least sensitive Class III bit (bit $D_A[89]$) and continuing through the most sensitive Class I bit (bit $D_A[0]$), the three CRC bits ($C_A[0]$, $C_A[1]$, $C_A[2]$), and the three flush bits (0, 0, 0). During this encoding process, the code rate is varied to provide the most protection to the most sensitive bits as shown in FIG. 4 (see below). The coder state is common to all algorithms and is initialized to zero before the first bit is coded. The state is not reset or otherwise modified when transitioning from one code rate to another.

Referring now to FIG. 4, the trellis encoded frame A is depicted as element 400, with the direction of trellis coding being depicted as element 420. Further, the Class III bits $D_A[89] \ldots D_A[46]$) to be trellis coded at ½ rate are depicted as element 401. Further, the Class II and I bits $D_A[45] \ldots D_A[0]$ are depicted as element 403. Also, three (3) flush bits are depicted as element 407. The bits 401 and the two (2) flush bits indicated as element 411 are encoded at ½ Rate, whereas the remaining bits indicated as element 409 are encoded at ⅓ Rate.

Trellis Coding at Rate ½

The Class III bits 401 are trellis coded at a rate of ½ using the 8-state trellis coded described as follows. The trellis is initialized in state 0, and a single input bit is shifted in to generate a single real-symbol. The trellis encoder consists of a state machine and an output symbol mapper. The current state and input bit are used to select an output real-symbol from FIG. 7, then the state is updated depending on the value of the input bit from FIG. 6. After all 44 Class III bits 401 have been coded, the final trellis state ("X") is used to indicate the trellis state in the section below.

Trellis Coding at Rate ⅓

The Class II and I bits 403, the CRC bits 19 and one (1) flush bit are coded at a rate of ⅓. Since a single 16-quadrature amplitude modulated (16-QAM) symbol can represent 4 bits of information, the three coder bits associated with the ⅓ rate code must be combined with an uncoded bit to specify the complete output symbol. The encoder is based on the same 8-state machine used in the ½ rate coder. The state machine is initialized with the final state "X" from the section above. The uncoded bit source is the Class V bits which are taken in order, beginning with $D_A[130]$ and continuing through $D_A[179]$.

The state update rules are identical to those for the ½ Rate coder shown in FIG. 6. The output symbol mapper rules shown in FIG. 8 provide for the two input bits per output complex-symbol, where one input bit is provided with a rate ⅓ code (and is also used to update the state machine), while the other bit is gray-code mapped uncoded into the output symbol. In FIG. 8, "Coded bit" indicates the next bit selected from the 50-bit data string consisting of 11 Class II bits, 35 Class I bits, 3 CRC bits, and 1 flush bit. After all 50 bit pairs have been coded, the final trellis state ("Y") from this section is used to initialize the trellis in the section below.

Trellis Coding at Rate ½ (Flush bits)

The two remaining flush bits are encoded using the same half-rate code as described in the above section, "Trellis Coding at Rate ½," initializing the state machine with the final state "Y" from the above section "Trellis Coding at Rate ⅓." At the completion of this section, the trellis will be returned to the zero state.

Uncoded Bits (Type 1)

Bits from Class IV are Gray-Code Mapped four at a time into complex symbols using FIG. 9. The bits are taken in order from most sensitive ($D_A[90]$) to least sensitive ($D_A[129]$).

Uncoded Bits (Type 2)

The Class V bits are combined with the ⅓ rate coded bits, as described in the above section "Trellis Coding at Rate ⅓."

The process next goes to step 315, "Encode Frame B," which corresponds to element 25 in FIG. 2. Here, the Class I, II, and III portions of the modified speech frame 34, including the second CRC unit 20, and three flush bits {0,0,0} are trellis encoded at the rates indicated in FIG. 5, with the three CRC bits 20 and one of the flush bits encoded at rate ⅓, and the final 2 flush bits encoded at rate ½. This trellis coding step 25 results in a second set of 83 symbols depicted as 26 in FIG. 2. This step is identical to step 313, described above.

The process next goes to step 317, "Block Interleave," which corresponds to step 27 in FIG. 2. This block interleave step accepts as input a string of 166 symbols based on the first set of 83 symbols 24 and the second set of 83 symbols 26 (332 RS formatted as I,Q,I,Q, . . . ), indexed 0 through 165, and produces as output a transmission unit of 166 symbols, indexed 0 through 165. The mapping between input and output strings is shown in FIG. 14. In FIG. 2, the transmission unit of 166 symbols is depicted as element 28. After the transmission unit 28 is transmitted, the process ends, step 319.

Therefore, a method of transmitting voice coding information has been disclosed. In summary, first 2 and second 4 frames of voice coding information are provided. Each frame is then prioritized 5, 9 based on which bits need to be forward-error corrected, thus forming a first 6 and second 10 prioritized frames. A six-bit CRC value 17 is then computed based on the prioritized first and second frames. The six-bit CRC value is then split into first 19 and second 20 3-bit CRC units. The first CRC unit is then combined with the first prioritized frame to form a modified first frame 32, and the second CRC unit is then combined with the second prioritized frame to form a modified second frame 34. The modified first and second frames are each then error correction coded 23, 25 to form first 24 and second 26 sets of symbols, respectively. The first and second set of symbols are then interleaved 27 into a transmission unit 28, which is then transmitted 29.

In accordance with the present invention, there is provided a method of providing near toll quality digital speech across a wide range of channel conditions using the existing iDEN system architecture. The advantage of this method over the prior art is the ability to use a new high quality 8000-bit-per-second VSELP vocoder in existing iDEN systems. The present invention effectively protects the most vulnerable VSELP-encoded bits from channel impairments.

Moreover, in concert with the method and apparatus disclosed in the aforementioned co-pending application, Ser. No. 08/551,103, entitled "Method and Apparatus for the Provision and Reception of Symbols," by Gregory Charles White et al., the present invention protects the encoded bits by unevenly applying error correction codes to the encoded bits, using a novel method of error correction coding. Further, the present invention is the first application of the technology disclosed in the co-pending CM01088G case to a method of transmitting voice coding information. The present invention transmits one CRC codeword per slot, the CRC codeword being derived from the most sensitive bits of two frames of VSELP-encoded bits. This results in a more accurate estimate of the integrity of the error control decoded information at an iDEN receiver than previously had been provided by the prior art. In summary, the present invention provides a significantly higher quality and more robust wireless voice service for the existing iDEN system than had previously been possible or available with the prior art.

While various embodiments of a method of transmitting voice coding information, in accordance with the invention, have been described hereinabove, the scope of the invention is defined by the following claims.

What is claimed is:

1. A method of transmitting voice coding information, comprising the steps of:

(a) providing a first frame of voice coding information comprising a plurality of bits and providing a second frame of voice coding information comprising a plurality of bits;

(b) prioritizing the bits of the first frame to form a first prioritized frame of voice coding information;

(c) prioritizing the bits of the second frame to form a second prioritized frame of voice coding information;

(d) forming a set of bits, the set of bits comprising a first part of the first prioritized frame and a second part of the second prioritized frame;

(e) computing a single cyclical redundancy check ("CRC") value using the set of bits;

(f) parsing the single CRC value into a first CRC unit and a second CRC unit;

(g) combining the first CRC unit with the first prioritized frame to form a modified first frame;

(h) combining the second CRC unit with the second prioritized frame to form a modified second frame;

(i) error correction coding at least some of the bits of the modified first frame to provide a first set of symbols;

(j) error correction coding at least some of the bits of the modified second frame to provide a second set of symbols;

(k) interleaving the first set of symbols and the second set of symbols to provide a transmission unit; and, (l) transmitting the transmission unit.

2. The method of claim 1 where the first frame comprises 180 bits.

3. The method of claim 1 where the second frame comprises 180 bits.

4. The method of claim 1 where the step of prioritizing the bits of the first frame to form a first prioritized frame of voice coding information comprises identifying bits from the first frame that are to be forward error correction coded, thus forming a first group of bits.

5. The method of claim 1 where the step of prioritizing the bits of the second frame to form a second prioritized frame of voice coding information comprises identifying bits from the second frame that are to be forward error correction coded, thus forming a second group of bits.

6. The method of claim 4 where the first group comprises 90 bits.

7. The method of claim 5 where the second group comprises 90 bits.

8. The method of claim 1 where the set of bits comprises 70 bits.

9. The method of claim 6 where the first part comprises 35 bits, the first part being based on the first group.

10. The method of claim 7 where the second part comprises 35 bits, the second part being based on the second group.

11. The method of claim 1 where the single cyclical redundancy check value comprises 6 bits.

12. The method of claim 1 where the first CRC unit comprises 3 bits.

13. The method of claim 1 where the second CRC unit comprises 3 bits.

14. The method of claim 1 where the first set of symbols comprises 83 symbols.

15. The method of claim 1 where the second set of symbols comprises 83 symbols.

16. The method of claim 1 where the transmission unit comprises 166 symbols.

17. The method of claim 1 where the modified first frame comprises 183 bits.

18. The method of claim 1 where the modified second frame comprises 183 bits.

* * * * *